(12) United States Patent
Tsai et al.

(10) Patent No.: US 10,834,038 B2
(45) Date of Patent: Nov. 10, 2020

(54) REAL-TIME COMMUNICATION SYSTEM AND DYNAMIC EXPRESSION RENDERING DEVICE

(71) Applicant: QUANTA COMPUTER INC., Taoyuan (TW)

(72) Inventors: Ming-Ju Tsai, Taoyuan County (TW); Chieh-Sheng Ding, Taoyuan County (TW); Hsin-Yi Cheng, Taoyuan County (TW); Ming-Tsung Yen, Taoyuan County (TW); Ching-Wen Wu, Taoyuan County (TW)

(73) Assignee: QUANTA COMPUTER INC. (TW)

( * ) Notice: Subject to any disclaimer, the term of this patent is extended or adjusted under 35 U.S.C. 154(b) by 31 days.

(21) Appl. No.: 16/222,493

(22) Filed: Dec. 17, 2018

(65) Prior Publication Data
US 2020/0028809 A1    Jan. 23, 2020

(30) Foreign Application Priority Data
Jul. 19, 2018 (TW) .............................. 107124950 A

(51) Int. Cl.
G06F 15/16 (2006.01)
H04L 12/58 (2006.01)
G06F 3/16 (2006.01)

(52) U.S. Cl.
CPC .............. H04L 51/10 (2013.01); H04L 51/04 (2013.01); *G06F 3/165* (2013.01)

(58) Field of Classification Search
CPC .......... H04L 51/10; H04L 51/04; G06F 3/165
See application file for complete search history.

(56) References Cited

U.S. PATENT DOCUMENTS

2016/0012465 A1* 1/2016 Sharp ................... G06Q 20/384
                                                         705/14.17
2017/0347120 A1* 11/2017 Chou ...................... H04N 19/15

FOREIGN PATENT DOCUMENTS

CN          103914005 A  *  7/2014
CN          103914005 A     7/2014

* cited by examiner

*Primary Examiner* — Sm A Rahman
(74) *Attorney, Agent, or Firm* — Innovation Counsel LLP

(57) ABSTRACT

A real-time communication system includes a cloud server, multiple user devices having respective real-time communication software for communicating with the cloud server, and multiple dynamic expression rendering devices one-to-one communicating with the user devices respectively. A transmitting user device encodes and transmits a transmitter data, a receiver data and a dynamic expression ID of a selected dynamic expression. The cloud server decodes and transmits the transmitter data, the receiver data and the dynamic expression ID of the selected dynamic expression to a receiver user device. Based on the received dynamic expression ID, the real-time communication software of the receiver user device finds the dynamic expression. The real-time communication software of the receiver user device transmits an audio file and/or a dynamic expression action command of the dynamic expression to a dynamic expression rendering device which renders the audio file and/or the dynamic expression action of the dynamic expression.

9 Claims, 2 Drawing Sheets

REAL-TIME COMMUNICATION SYSTEM AND DYNAMIC EXPRESSION RENDERING DEVICE

This application claims the benefit of Taiwan application Serial No. 107124950, filed Jul. 19, 2018, the subject matter of which is incorporated herein by reference.

BACKGROUND OF THE INVENTION

Field of the Invention

The invention relates in general to a real-time communication system and a dynamic expression rendering device.

Description of the Related Art

As the smart phones have become more and more popular, people become more and more dependent on the real-time communication software in their communication. Through existing real-time communication software, people send texts, pictures, videos, voices, and emoticons to share their mood, feelings and thoughts to the communication object.

However, people are still unable to send a physical action to the communication object to express theirs mood, feelings and thoughts in a real-time manner through existing real-time communication software or other device.

Therefore, the present disclosure provides a real-time communication system, which makes the communication object feel the transmitter's mood, feelings and thoughts more directly through a combination of voices and physical action (dynamic expression).

SUMMARY OF THE INVENTION

According to one embodiment of the invention, a real-time communication system is provided. The real-time communication system includes a cloud server, a plurality of user devices each being installed with a respective real-time communication software for communicating with the cloud server, and a plurality of dynamic expression rendering devices communicating with the user devices in a one-to-one correspondence. A transmitting user device among the user devices encodes a transmitter data, a receiver data and a dynamic expression ID of a selected dynamic expression and then transmits the encoded data to the cloud server. The cloud server decodes the transmitter data, the receiver data and the dynamic expression ID of the selected dynamic expression and then transmits the decoded data to a receiver user device among the user devices. Based on the received dynamic expression ID of the dynamic expression, the real-time communication software of the receiver user device finds the dynamic expression. The real-time communication software of the receiver user device transmits an audio file and/or a dynamic expression action command of the dynamic expression to a dynamic expression rendering device among the dynamic expression rendering devices. The dynamic expression rendering device renders the audio file and/or the dynamic expression action of the dynamic expression.

According to another embodiment of the invention, a dynamic expression rendering device is provided. The dynamic expression rendering device includes a microprocessor, a communication module coupled to and controlled by the microprocessor for communicating with a user device, and an action module coupled to and controlled by the microprocessor. The microprocessor processes a dynamic expression received from the user device and controls the action module to actuate according to the dynamic expression.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical characteristics. Given that each embodiment is implementable, a person ordinarily skilled in the art can selectively implement or combine some or all of the technical characteristics of any embodiment of the present disclosure.

Figure 1:
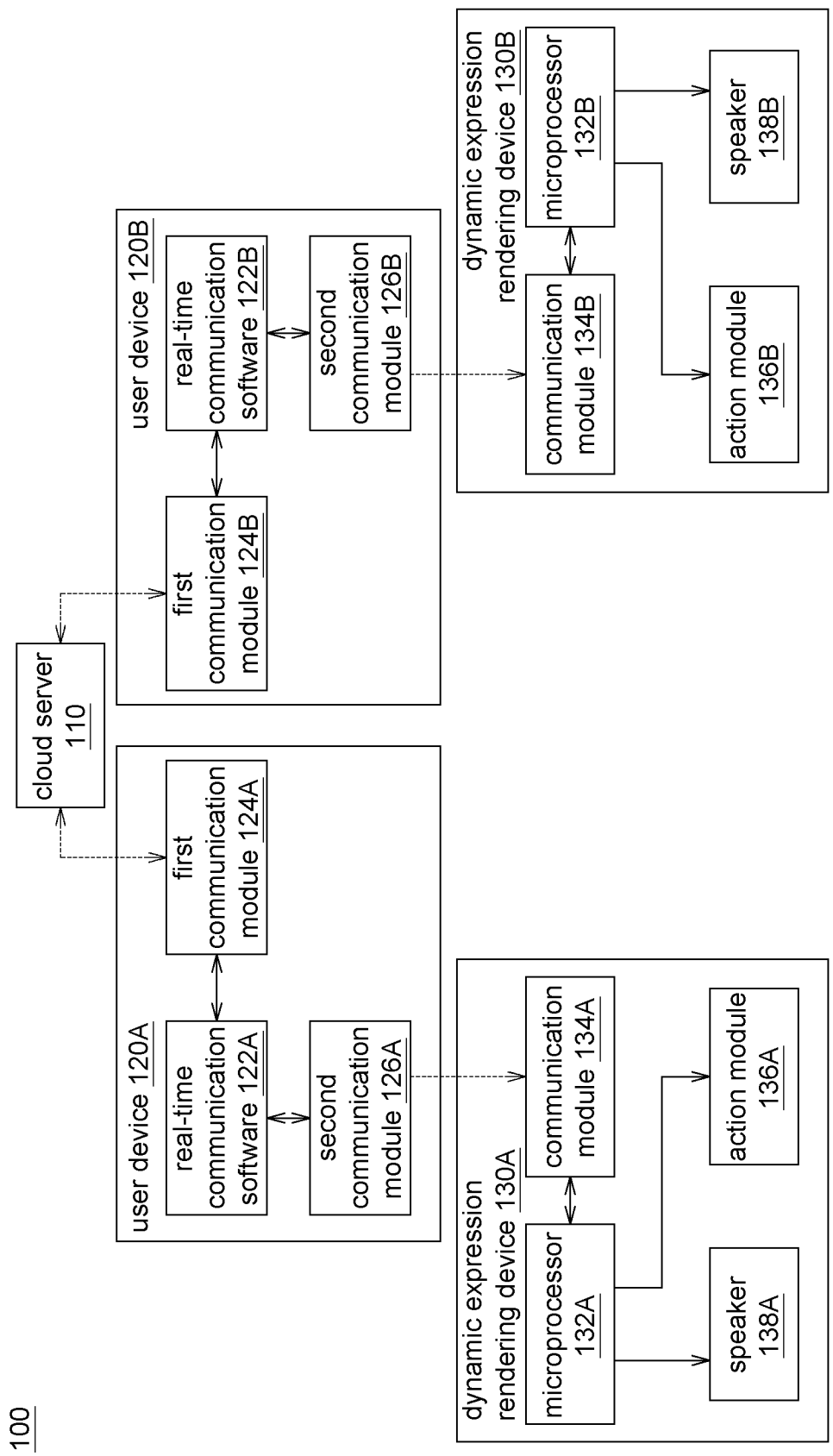
FIG. 1 shows a functional block diagram of a real-time communication system according to an embodiment of the present disclosure.

FIG. 1 shows a functional block diagram of a real-time communication system according to an embodiment of the present disclosure. As indicated in FIG. 1, the real-time communication system 100 according to an embodiment of the present disclosure at least includes a cloud server 110, a plurality of user devices and a plurality of dynamic expression rendering devices. Although the description of the present specification is exemplified by two user devices 120A and 120B and two dynamic expression rendering devices 130A and 130B, it should be understood that the present disclosure is not limited thereto. Basically, the user devices and the dynamic expression rendering devices form a one-to-one correspondence.

The cloud server 110 processes data exchange between the user devices 120A and 120B.

The user devices 120A and 120B may be realized by such as smart phones, tablets, or personal computers. Real-time communication software 122A and 122B are installed in the user devices 120A and 120B. The user devices 120A and 120B includes first communication modules 124A and 124B and second communication modules 126A and 126B. Both the first communication modules 124A and 124B and the second communication modules 126A and 126B are controlled by the real-time communication software 122A and 122B.

The first communication modules 124A and 124B communicate with the cloud server 110. Illustratively but not restrictively, the first communication modules 124A and 124B may support wireless network (WiFi), 4G, 3G, and Ethernet network.

The second communication modules 126A and 126B communicate with the dynamic expression rendering devices 130A and 130B. Illustratively but not restrictively, the second communication modules 126A and 126B may support Bluetooth (BT).

The user devices 120A and 120B transmit and receive texts, pictures, voices, videos, emoticons, and dynamic expressions for real-time communication. The user devices 120A and 120B display (or play) the received texts, pictures, voices, videos, and emoticons for real-time communication. Besides, the user devices 120A and 120B transmit the audio file and/or the dynamic expression action command to the dynamic expression rendering devices 130A and 130B.

The dynamic expression rendering devices 130A and 130B include microprocessors 132A and 132B, communication modules 134A and 134B, action modules 136A and 136B, and speakers 138A and 138B.

The microprocessors 132A and 132B control the communication module 134A and 134B, the action modules 136A and 136B, and the speakers 138A and 138B. The microprocessors 132A and 132B process the audio files and/or the dynamic expression action commands received from the user devices 120A and 120B. If the dynamic expression rendering devices 130A and 130B receive a dynamic expression action command from the user devices 120A and 120B, then the microprocessors 132A and 132B enable the action modules 136A and 136B to actuate according to the dynamic expression action command. If the dynamic expression rendering devices 130A and 130B receive an audio file from the user devices 120A and 120B, then the microprocessors 132A and 132B enable the speakers 138A and 138B to play the audio file.

The communication module 134A and 134B are coupled to the microprocessors 132A and 132B. The communication module 134A and 134B communicate with the user devices 120A and 120B. Illustratively but not restrictively, the communication module 134A and 134B may support Bluetooth (BT).

The action modules 136A and 136B are coupled to the microprocessors 132A and 132B. Based on the dynamic expression action command received from the user devices 120A and 120B by the dynamic expression rendering devices 130A and 130B, the action modules 136A and 136B are controlled by the microprocessors 132A and 132B to actuate according to the dynamic expression action command. Illustratively but not restrictively, the action modules 136A and 136B may actuate dynamic expression actions such as moving the eyebrows, moving the eyes, moving the mouth, moving the hands, or moving the legs.

The speakers 138A and 138B are coupled to the microprocessors 132A and 132B. Based on the audio file received from the user devices 120A and 120B by the dynamic expression rendering devices 130A and 130B, the speakers 138A and 138B are controlled by the microprocessors 132A and 132B to play the audio file.

In an embodiment of the present disclosure, the dynamic expression data at least includes: (1) a dynamic expression ID, (2) a dynamic expression name, (3) a dynamic expression picture, (4) an audio file, and (5) a dynamic expression action command. Each dynamic expression has a unique dynamic expression ID. The dynamic expression picture may be selected from the pictures stored in the user devices 120A and 120B (or the pictures obtained by the user devices 120A and 120B from the Internet) or pictures captured by respective cameras of the user devices 120A and 120B. The audio file may be selected from the audio files stored in the user devices 120A and 120B (such as the music files) or a user-recorded audio file recorded using respective in-built microphone of the user devices 120A and 120B or using an external microphone. The external microphone is connected to the user devices 120A and 120B in a wired or wireless manner and is controlled by the user devices 120A and 120B. The dynamic expression action command controls the dynamic expression rendering devices 130A and 130B to actuate.

Let the dynamic expression ID be taken for example. Each dynamic expression has a unique dynamic expression ID. That is, a first dynamic expression may only have one audio file, and a dynamic expression ID 001 is assigned to the first dynamic expression. A second certain dynamic expression may only have one dynamic expression action (such as moving the hands), and a dynamic expression ID 002 may be assigned to the second dynamic expression. A third dynamic expression may only have an audio file and a dynamic expression action (such as moving the hands plus moving the legs), and a dynamic expression ID 003 may be assigned to the third dynamic expression. The rest may be obtained by the same analogy.

In an embodiment of the present disclosure, the dynamic expression data may be pre-installed on the user devices 120A and 120B and is backup in the cloud server 110.

Or, the dynamic expression data may be pre-made by the provider and backed up in the cloud server 110 but not installed on the user devices 120A and 120B. Such dynamic expression data is stored in the cloud server 110, and the user devices 120A and 120B may download the dynamic expression data from the cloud server 110.

Or, the dynamic expression data may be made by the user on the user devices 120A and 120B. That is, the user may edit/make the dynamic expression using the real-time communication software 122A and 122B or other editing software. After the dynamic expression is made on the user devices 120A and 120B, the real-time communication software 122A and 122B may upload the dynamic expression to the cloud server 110, which assigns a dynamic expression ID to the dynamic expression made on the user devices 120A and 120B.

Figure 2:
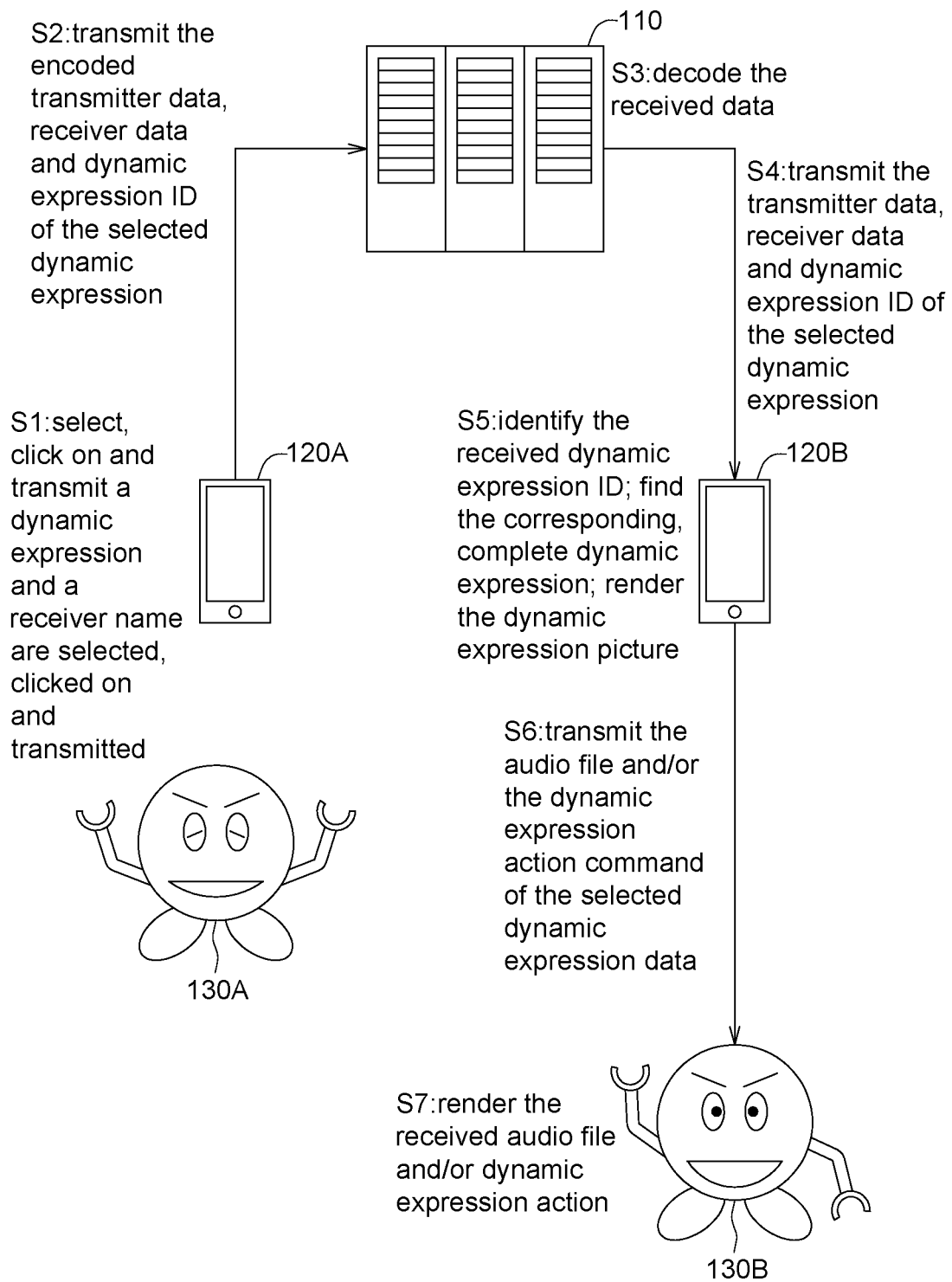
FIG. 2 shows an operational diagram of a real-time communication system according to an embodiment of the present disclosure.

FIG. 2 shows an operational diagram of a real-time communication system according to an embodiment of the present disclosure. In the following descriptions, the user device 120A is exemplified by a transmitter, and the user device 120B is exemplified by a receiver.

In step S1, a dynamic expression and a receiver name are selected, clicked on, and transmitted by a user using the real-time communication software 122A of the user device 120A.

In step S2, the transmitter data, the receiver data and the dynamic expression ID of the selected dynamic expression are encoded and transmitted to the cloud server 110 by the real-time communication software 122A of the user device 120A.

In an embodiment of the present disclosure, all dynamic expressions have a backup stored in the cloud server 110. Therefore, when the transmitter transmits the dynamic expression, the transmitter does not need to upload the complete dynamic expression data. The transmitter only needs to transmit the corresponding dynamic expression ID to the cloud server. Similarly, the cloud server only needs to transmit the corresponding dynamic expression ID to the receiver (instead of transmitting the complete dynamic expression data). Thus, the required transmission traffic can be reduced during transmission.

In step S3, data received by the cloud server 110 are decoded to into the transmitter data, the receiver data and the dynamic expression ID of the selected dynamic expression.

In step S4, the transmitter data, the receiver data and the dynamic expression ID of the selected dynamic expression are transmitted to the receiver (the user device 120B) by the cloud server 110.

In step S5, the received dynamic expression ID is identified by the real-time communication software 122B of the receiver (the user device 120B) to determine whether the dynamic expression has been stored in the real-time communication software 122B of the receiver (the user device 120B). If the dynamic expression is not stored in the real-time communication software 122B of the receiver (the user device 120B), then the real-time communication software 122B of the receiver (the user device 120B) sends a reminder to remind the user of downloading the complete dynamic expression corresponding to the dynamic expression ID from the cloud server 110 through the real-time communication software 122B of the receiver (the user device 120B).

In step S5, based on the received dynamic expression ID, the real-time communication software 122B of the receiver (the user device 120B) finds out the corresponding whole dynamic expression.

In step S5, the dynamic expression picture is rendered on the display module of the receiver (the user device 120B) by the real-time communication software 122B of the receiver (the user device 120B). Or, in step S5, the received texts, pictures, voices, videos, and emoticons are rendered for real-time communication by the real-time communication software 122B of the receiver (the user device 120B).

In step S6, the audio file and/or the dynamic expression action command of the selected dynamic expression data are transmitted to the dynamic expression rendering device 130B by the real-time communication software 122B of the receiver (the user device 120B).

In step S7, the received audio file and/or the dynamic expression action are rendered by the dynamic expression rendering device 130B. That is, the speaker 138B of the dynamic expression rendering device 130B may play the audio file of the dynamic expression. Or, the action module 136B of the dynamic expression rendering device 130B may render the dynamic expression action (such as moving the eyebrows, moving the eyes, moving the mouth, moving the hands, moving the legs).

That is, in one example, suppose that the transmitter (the user 120A) selects the dynamic expression to play a laughter (the audio file) and moving the hands. Then, the speaker 138B of the dynamic expression rendering device 130B will play the laugher, and the action module 136B of the dynamic expression rendering device 130B will render the dynamic expression action of moving the hands. The rest can be obtained by the same analogy.

In an embodiment of the present disclosure, apart from transmitting texts, pictures, videos and emoticons to the receiver in a real-time manner, the real-time communication system may further render the dynamic expression (including any combination of the audio file and the dynamic expression action) selected by the transmitter on the dynamic expression rendering device of the receiver. Thus, the real-time communication between the transmitter and the receiver becomes more interesting.

While the invention has been described by example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A real-time communication system, comprising:
   a cloud server;
   a plurality of user devices each being installed with a respective real-time communication software for communicating with the cloud server; and
   a plurality of dynamic expression rendering devices communicating with the user devices in a one-to-one correspondence,
   wherein
   a transmitting user device among the user devices encodes a transmitter data, a receiver data and a dynamic expression ID number of a selected dynamic expression and transmits the encoded data to the cloud server wherein the dynamic expression is editable by the real-time communication software of the user device;
   the cloud server decodes the transmitter data, the receiver data and the dynamic expression ID number of the selected dynamic expression and transmits the decoded data to a receiver user device among the user devices;
   the real-time communication software of the receiver user device finds the dynamic expression by decoding the received dynamic expression ID number of the dynamic expression;
   the real-time communication software of the receiver user device transmits an audio file and/or a dynamic expression action command of the dynamic expression to a dynamic expression rendering device among the dynamic expression rendering devices; and
   the dynamic expression rendering device renders the audio file and/or the dynamic expression action of the dynamic expression.

2. The real-time communication system according to claim 1, wherein besides the audio file and the dynamic expression action command, the dynamic expression further comprises the dynamic expression ID number, a dynamic expression name and a dynamic expression picture.

3. The real-time communication system according to claim 2, wherein the dynamic expression picture is selected from pictures stored in the user devices or the pictures captured by respective camera of the user devices.

4. The real-time communication system according to claim 2, wherein the audio file is selected from audio files stored in the user devices or a user-recorded audio file recorded using respective in-built microphone of the user devices or using an external microphone.

5. The real-time communication system according to claim 1, wherein
   the dynamic expression is pre-installed on the user devices and backed up in the cloud server; or
   the dynamic expression is backed up in the cloud server but not installed on the user devices; or
   the dynamic expression is made by the user devices and uploaded to the cloud server, which assigns the dynamic expression ID number to the dynamic expression.

6. The real-time communication system according to claim 1, wherein
   the real-time communication software of the receiver user device identifies the received dynamic expression ID number to determine whether the dynamic expression has been stored in the receiver user device; and
   if the dynamic expression is not stored, then the real-time communication software of the receiver user device downloads the dynamic expression corresponding to the dynamic expression ID number from the cloud server.

7. The real-time communication system according to claim 1, wherein each of the dynamic expression rendering devices comprises:

a microprocessor;

a communication module coupled to and controlled by the microprocessor for communicating with a user device; and an action module coupled to and controlled by the microprocessor;

wherein the microprocessor processes the dynamic expression received from the user devices and controls the action module to actuate according to the dynamic expression.

8. The real-time communication system according to claim 1, wherein each of the dynamic expression rendering devices further comprises:

a speaker coupled to and controlled by the microprocessor, wherein if the dynamic expression received from the user devices comprises the audio file, the microprocessor controls the speaker to play the audio file.

9. The real-time communication system according to claim 1, wherein based on the dynamic expression action command of the dynamic expression received from the user devices by the dynamic expression rendering device, the microprocessor controls the action module to actuate according to the dynamic expression action command.

\* \* \* \* \*